United States Patent [19]

Siciliano

[11] 3,853,933
[45] Dec. 10, 1974

[54] CONTINUOUS PROCESS FOR PRODUCING POLYSILOXANE OILS UTILIZING A CARBON BLACK CATALYST

[75] Inventor: George R. Siciliano, Ballston Lake, N.Y.

[73] Assignee: General Electric Company, Waterford, N.Y.

[22] Filed: Jan. 14, 1974

[21] Appl. No.: 433,095

[52] U.S. Cl.................. 260/448.2 E, 260/448.8 R
[51] Int. Cl. ........................................... C07f 7/08
[58] Field of Search .. 260/448.2 E, 448.8 R, 46.5 R

[56] References Cited
UNITED STATES PATENTS

| | | | |
|---|---|---|---|
| 3,607,899 | 9/1971 | Brown et al. | 260/448.2 E |
| 3,714,213 | 1/1973 | Miller et al. | 260/448.2 E |
| 3,803,195 | 4/1974 | Nitzsche et al. | 260/448.2 E |

Primary Examiner—Daniel E. Wyman
Assistant Examiner—Paul F. Shaver
Attorney, Agent, or Firm—Donald J. Voss, Esq.; E. Philip Koltos, Esq.; Frank L. Neuhauser, Esq.

[57] ABSTRACT

A continuous process for producing diorganopolysiloxane oils of 3 to 50,000 centipose viscosity at 25° C with a controlled hydroxy content comprising continuously transferring a fluid siloxane feed mixture into contact with a catalyst bed of acid-activated granular carbon black having a carbon to acid ratio of 10 parts to 1 to 40 parts to 1, which catalyst bed is maintained at 85° to 150° C and over which catalyst bed there is maintained a vacuum of 5 to 200 millimeters of mercury. From this catalyst bed there is continually removed water. From the catalyst bed there continuously passes a product stream containing the desired diorganopolysiloxane product of 3 to 50,000 centipose viscosity and various other low boiling siloxanes, which product stream contains 100 parts per million to 1 percent by weight of water and from 0 to 5 parts per million of acid. In a variation of this continuous process, the siloxane feed stream is passed into a first catalyst bed which may be in a column which is again filled with acid-activated granular carbon black with the same carbon to acid ratio as set forth above and over which there is a vacuum such that the water is continuously removed from the siloxane feed mixture so that there passes from said first catalyst bed a first product stream containing less than 100 parts per million of water. Said first product stream is passed into a second catalyst bed of acid-activated granular carbon black of the same carbon to acid ratio as set forth in the previous process and which second catalyst bed is again maintained at 85° to 150° C and which is at least at atmospheric pressure. There is continuously transferred from the second catalyst bed a second product stream containing the desired diorganopolysiloxanes of 3 to 50,000 centipoise viscosity at 25° C and also having therein various low boiling siloxanes which second product stream has 0 to 50 parts per million of acid and less than 100 parts per million of water.

18 Claims, No Drawings

CONTINUOUS PROCESS FOR PRODUCING POLYSILOXANE OILS UTILIZING A CARBON BLACK CATALYST

BACKGROUND OF THE INVENTION

The present invention relates to a continuous process for producing diorgranopolysiloxane oils of a viscosity of 3 to 50.000 centipoise at 25° C and more particularly the present invention relates to a continuous process for producing a diorganopolysiloxane polymer with the utilization of an acid-activated granular carbon black.

Diorganopolysiloxane oils of 3 to 50.000 centipoise at 25° C are well known materials in the silicone art. Such compositions have many uses such as, for instance, in forming hydraulic fluid compositions and in forming lubricating compositions. Such oils are also desirable as constituents of silicone grease, as constituents of anitfoam compositions for aqueous systems, and as a constituent for forming mold release compositions.

In the past, such diorganopolysiloxane oils were made in a batch-wise process. In the very initial part of work in this area, a worker skilled in the art used to take dichlorosilanes into which there was mixed a certain amount of triorganochlorosilanes and these halogen silanes were simply added to water so as to hydrolyze them and form a mixture of linear and cyclicsiloxanes in water. The hydrogen chloride gas was then stripped off and most of the water was decanted so as to leave behind a mixture of cyclicsiloxanes, linear siloxanes and also low molecular weight silanol-stopped diorganopolysiloxanes.

At this point, it it was desired to have a low viscosity diorganopolysiloxane which was triorganosiloxy end-stopped, such materials of low viscosity could be separated from the mixture by various distillation processes. It was decided to improve the efficiency of the process so as to change as much of the cyclic materials and the low molecular weight silanol-terminated diorganolpolysiloxanes to the appropriate triorgano end-stopped diorganopolysiloxane of the desired viscosity. Thus, it was desired to convert as much of the cyclicsiloxanes, the disiloxanes and the silanol-stopped material as possible into the triorgano end-stopped diorganopolysiloxane which was the desired material, so as to increase the efficiency of the process. A commercial means of doing this was found to equilibrate at elevated temperature the mixture of linear and cyclicsiloxanes in the presence of an acid so as to obtain as high a yield as posiible of the desired viscosity triorganosiloxy end-stopped diorganopolysiloxane.

In such equilibration process there was early utilized liquid acids such as, sulfuric acid, hydrochloric acid, and weak acids such as, acetic acid and other such acids. The weak acids were found to not obtain a sufficient degree of equilibration in the reaction, that is, a sufficient degree of conversion of the initial siloxane materials to the desired viscosity triorganousiloxy end-stopped diorganopolysiloxane, within an economic time.

In the case of liquid strong acids such as, sulfuric acid, the desired amount of equilibration or conversion of the initial siloxane starting materials was carried out. However, the sulfuric acid tended to cleave hydrocarbon substituent groups attached to the silicon atoms and also presented a neutralization problem since the product that was made in such processes contained the sulfuric acid in it which would have to be completely neutralized, otherwise, the end-product would have a certain amount of acidity in it which would degrade the diorganopolysiloxane oil.

In the batch process in which such liquid acids were used they were found to be unsatisfactory since, as stated previously, the sulfuric acid or strong acids while bringing about the desired conversion tended to attack and cleave hydrocarbon substituent groups that were attached to the silicon atoms, thus, lowering the quality of desired product.

Accordingly, it was suggested by workers in the field that cation exchange resins be utilized in such an equilibration process. While such cation exchange resins were found to be somewhat suitable in batch processes, they could not be applied in a continuous equilibration process for the production of triorganosiloxy end-stopped diorganopolysiloxanes of 3 to 50,000 centipoise viscosity at 25° C, since they tended to require a large residence time of the siloxane feed mixture in contact with an ion exchange resin in order to obtain the optimum conversion of the siloxanes in the feed mixture. Thus, such ion exchange resins in a commercial process require residence time of the siloxane feed mixture of 5 hours or more in order to obtain the optimum conversion during equilibration of the feed mixture. Thus, such long residence times would necessitate having very large amounts of such ion exchange resins in the catalyst bed and very large columns to contain such catlayst bed so as to obtain the proper yield from such a catalyst bed. This, of course, made the process costly.

Another disadvantage in the use of ion exchange resins was that they were unduly expensive, that is, the cost of ion exchange resins far exceeds the cost of other catalysts that may be utilized in such equilibration processes. Thus, the cost of having an ion exchange resin catalyst bed system which would be commercial and would be continuous for producing large quantities of the desired triorgano end-stopped diorganopolysiloxane oils is prohibitedly expensive. In addition, at the elevated temperatures which are used in equilibrations the ion exchange resins degrade.

Another type of catalyst that was tried in batch processes for producing trioganousiloxy end-stopping diorganopolysiloxane oils was the use of acid treated carbon black. However, there were two difficulties with the prior art processes in the use of acid treated carbon black. In the first instance, the type of carbon black that was utilized was unsuitable for a continuous batch process since the siloxane feed mixture could not flow through it fast enough and there would be an unduly long residence time in the carbon black catalyst bed.

The basic disadvantages of such prior art batchwise carbon black catalyst systems was that the water that was present in the siloxane feed mixture has to be removed prior to the time the feed mixture was fed to the catalyst bed. The presence of water in such batch-wise processes and the lack of removal of it would result in various by-products being formed since the water was equilibrated along with the other siloxanes in the conversion process such that a large quantity of undesirable by-products were formed thus lowering the yield of the desired triorganosiloxy end-stopped diorganopolysisloxane oils. Excess water also tended to destruct the catalyst.

Thus, the worker skilled in the field did not reqard acid-treated carbon black as a suitable catalyst for the batch-wise equilibration or conversion of a siloxane feed mixture to a triorganosiloxy end-stopped diorganopolysiloxane oil and specifically acid-treated carbon blacks were not comtemplated or considered for a continuous process for producing triorgano end-stopped diorganopolysiloxane oils or polymers of a desired viscosity.

Another type of material that was tried in such prior art batch-wise equilibration for producing triorgano end-stopped diorganopolysiloxane oils was acid-treated clays. However, most of such acid-treated clays were found unsuitable for various reasons such as, the requirement of a long residence time of the siloxane feed mixture in the catalyst bed. However, these problems were solved in a particular and advantageous type of acid-treated clay and a particular type of process was found to be quite economical and efficient in producing triorgano end-stopped diorganopolysiloxane oils of 3 to 50.000 centipoise viscosity at 25° C, which continuous process is disclosed and claimed in the copending patent application of Norman G. Holdstock and George R. Sicilano, entitled "Continuous process for Producing Polysiloxane Oils," Ser. No. 433,123, filed on the same date as the present application. Although this is a very advantageous and efficient process for the production of triorganosiloxy end-stopped diorganopolysiloxane oils, it has the disadvantage of requiring excessively high temperatures in the catalyst bed which increases the energy cost of the process as well as requires the use of two columns.

Thus, it is one object of the present invention to provide for a continuous process for the production of triorganosiloxy end-stopped diorganopolysiloxane oils of 3 to 50,000 centipoise viscosity at 25° C by the use of an acid-treated carbon black as the main catalyst.

It is another object of the present invention to provide an inexpensive and efficient process for the production of a triotganosiloxy end-stopped diorganopolysiloxane of a 3 to 50,000 centipoise viscosity at 25° C.

It is an additional object of the present invention to provide a continuous process for the production of triorgano end-stopped diorganopolysiloxane oils of 3 to 50,000 centipoise viscosity at 25° C, which diorganopolysiloxane oil is produced in a continuous equilibration process at low temperatures, that is, temperatures in the neighborhood of 85° to 150° C.

It is still an additional object of the present invention to provide a continuous process for the production of triorganosiloxy end-stopped diorganopolysiloxane oils of 3 to 50,000 centipoise viscosity at 25° C, such that during the foregoing process in which there is used an acid-activated carbon black catalyst bed, the siloxane feed mixture that is fed into said acid-activated carbon black catalyst bed may either contain large amounts of water or may contain very small amounts of water which amounts of water will have no affect on the yield of the process in a continuous manner.

It is yet another object of the present invention to provide a process for the continuous production of triorganosiloxy end-stopped diorganopolysiloxane oils of 3 to 50,000 centipoise viscosity at 25° C in high yield with the use of a relatively inexpensive acid-activated carbon black catalyst as compared to ion exchange resin catalysts.

These and other objects of the present invention are accomplished by means of the disclosure set forth herein below.

SUMMARY OF THE INVENTION

In accordance with the present invention, there is provided a continuous process for producing diorganopolysiloxane oils of 3 to 50,000 centipoise viscosity at 25° C comprising continuously passing a fluid siloxane feed mixture having therein siloxanes selected from the class consisting of

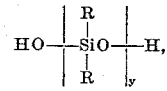

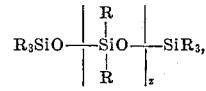

and mixtures thereof where R is selected from the class consisting of alkyl radicals, alkenyl radicals, cycloalkyl radicals and mixtures thereof of one to 15 carbon atoms, $x$ varies from 3 to 8, $y$ varies from 1 to 10 and $z$ varies from 1 to 10, into contact with a catalyst bed of acid-activated granular carbon black having a carbon to acid ratio of 10 parts to 1 part to 40 parts to 1 part, which catalyst bed is maintained at 85° to 150° C and over which catalyst bed there is maintained a vacuum of 5 to 200 millimeters of mercury and more preferably 10 to 100 millimeters of mercury and removing from the catalyst bed a product stream containing the diorganopolysiloxane of 3 to 50,000 centipoise viscosity at 25° C and which product stream may contain various other low boiling siloxanes.

From said catalyst bed there is continually removed water such that the feed stream that was passed into the catalyst bed contained 200 parts per million too 5 percent water and wherein the product stream emanating from the catalyst bed has from 100 parts per million to 1 percent by weight of water and 0 to 5 parts per million of acid.

There is further comprised in this process passing the product stream from said catalyst bed into a distillation column maintained at 250° to 300° C and 5 to 30 millimeters of mercury pressure and removing from the distillation column low boiling siloxanes which are recylced or sent back into the siloxane feed mixture that is passed into the catalyst bed and there emanates from the distillation column, or there is transferred from the distillation column, a final product stream which is essentially a pure stream of the desired viscosity triorganosiloxy end-stopped diorganopolysiloxane oils of 3 to 50,000 centipoise viscosity at 25° C.

It is desirable before the siloxane feed mixture is fed to the catalyst column that it be passed through a heated exchanger and heated from 85° to 150° C.

It is also critical that the acid-activated granular carbon black that is utilized in the catalyst bed be activated with an acid selected from the class consisting of sulfuric acid and hydrochloric or other strong acids and that it generally have a U.S. mesh size that varies from 8 to 70 and a surface area that varies from 700 to 2000 square meters per gram.

It is also essential that the carbon to acid ratio be in the above general range specified. If the acid-activated carbon black does not meet the above specifications, then the optimum conversion to the triorgano end-stopped diorganopolysiloxane oil will not be obtained during the equilibration portion of the process.

It is also critical in order to carry out the optimum equilibration or conversion during the equilibration portion of the process and also to have a proper flow rate of the siloxane feed mixture to the catalyst bed that the acid-activated granular carbon black utilized in the catalyst bed of the continuous process of the present invention have the U.S. mesh size and the surface area set forth above.

There is also provided by the present invention an alternate continuous process for producing a diorganopolysiloxane oil of 3 to 50,000 centipoise viscosity at 25° C comprising continuously passing siloxane feed mixture having anywhere from 1000 parts per million to 10 percent by weight of water, wherein the siloxanes are selected from the class given previously in the prior embodiment, which siloxane feed mixture is passed into contact with a first catalyst bed of acid-activated granular carbon black having a carbon to acid ratio again of 10 parts to 1 part to 40 parts to 1 part which catalyst bed is maintained at 85° to 200° C and over which catalyst bed there is maintained a vacuum of 5 to 200 millimeters of mercury. In this first catalyst bed, the siloxane feed mixture is partially polymerized and the silanol groups in the low molecular weight silanol-stopped diorganopolysiloxane ingredients are condensed out and, thus, with this formation of water and with the water that was initially present in the siloxane feed mixture, this amount of water is continuously removed from said first catalyst bed, such that there is continuously transferred from said first catalyst bed a first product stream containing the partially polymerized siloxane feed mixture that has less than 100 parts per million of water. The material is then transferred into a second catalyst bed of the acid-activated granular carbon black having again the carbon to acid ratio of 10 to 1 part to 40 parts to 1 part, which second catalyst bed is maintained at a temperature in the range of 85° to 150° C and at least at atmospheric pressure. There is continuously removed from said second catalyst bed a second product stream containing a mixture of the desired diorganopolysiloxane oils and various low boiling siloxanes, which second product stream contains from 0 to 50 parts per million of acid and less than 100 parts per million of water. The acid-activated carbon black in the first catalyst bed and the second catalyst bed in this alternate process has the same specifications as the acid-activated carbon black that was defined for the previous embodiment of the process of the present invention.

There further comprises in this second alternate process the possible neutralizing of said second product stream by passing through a bed of pure carbon black such that it has an acidity of 0 to 5 parts per million and passing said second product stream, thus neutralized, into a distillation column maintained at 250° to 300° C and 5 to 30 millimeters of mercury pressure so as to continuously remove low boiling siloxanes and recycle them into the siloxane feed stream that is passed into the first catalyst bed.

There also emanates from the distillation column a third product stream which third product stream essentially contains the pure diorganopolysiloxane oils of the desired viscosity of anywhere from 3 to 50,000 centipoise viscosity at 25° C.

Again, in the second alternate embodiment of the process of the present invention, it is preferred to pass the siloxane feed mixture through a heat exchanger so as to heat it at a temperature from 85° to 150° C before it is passed on to the first catalyst bed.

In the first embodiment of the process of the present invention given above, it is preferred that in the catalyst bed the acid-activated carbon black be present at a concentration of 40 percent to 200 percent by weight of the siloxane feed mixture in contact with the catalyst bed.

In the second embodiment of the process of the present invention, generally it is preferred that the said acid-activated carbon black which is present in a column in said first catalyst bed be present at a concentration of 10 to 200 percent by weight of the siloxane feed mixture and that acid-activated carbon black in said second catalyst bed which is also preferably in a column, be present at a concentration of 40 to 200 percent by weight of said first product stream.

DESCRIPTION OF THE PREFERRED EMBODIMENT

The siloxane feed mixture for the process of the present invention is produced by hydrolyzing a mixture of diorganodihalogensilanes of the formula $R_2SiX_2$, where X is halogen and preferably chlorine and R is selected from alkyl radicals, alkenyl radicals and cycloalkyl radicals of one to 15 carbon atoms and organohalogensilanes of the formula $R_2SiX$, where again X is halogen and preferably chlorine and R has the same difinition as given previously.

In the hydrolysis process, diorganodihalogensilanes and triorganohalogensilanes are utilized in as pure a form as possible so as to minimize the formation of undesirable by-products during the hydrolysis process and secondly, during the equilibration process of the present invention.

Accordingly, it is preferred that the diorganodihalogensilane contain at the most 1 percent of other silane impurities and the triorganohalogensilanes contain at the most about 1 percent by weight of other silane impurities. The amount of triorganohalogensilane with respect to the amount of diorganodihalogensilane that is utilized in the initial hydrolysis process will depend on how much chain-stopper it is desired to have in the process of the present case. The amount of triorganosiloxy end-stopped siloxanes that is desired to be formed in the hydrolysis mixture will depend on the desired final molecular weight and viscosity that is desired of the triorganosiloxy end-stopped diorganopolysiloxane that is desired to be formed by the process of the present invention. Accordingly, the desired mixture of diorganodihalogensilanes and triorganohalogensilanes is taken and poured into water. It is preferred to pour the silanes into water rather than pour the water into the silanes since in this way the reaction temperature of the hydrolysis mixture during hydrolysis is maintained below or at room temperature. It is desired to maintain the temperature of the hydrolysis mixture at room temperature since this prevents the boiling off or stripping of the low boiling silanes. If the water is poured into the organosilanes then it is preferred that there be condensation equipment on top of the hydrolysis kettle so as to return any stripped organosilanes back into the hydrolysis mixture.

Accordingly, in the preferred procedure the mixture of organosilanes is poured slowly into water with constant agitation for a period of ½ hour to 3 hours. The amount of water that is utilized is slightly above the stoichiometric amount necessary to completely hydrolyze the halogen groups in the organohalogensilanes. Generally and preferably, there is utilized anywhere from 10 to 100 percent of excess water in addition to the amount that is stoichiometrically necessary to hydrolyze all the halogen groups or chlorine groups in the organohalogensilane mixture. After all the organohalogensilanes have been added to the water, the water hydrolysis mixture is generally heated to a temperature of 25° to 60° C so as to strip off most of the halogen acid that has been formed during the hydrolysis, such as, hydrochloric acid. After this step in the procedure has been completed, then the water is decanted from the hydrolysis mixture to leave a siloxane feed mixture that is slightly acidic. In the more preferred embodiment of the present invention, a mild base such as sodium bicarbonate or ammonium hydroxide is added to the siloxane mixture either before or after the water is decanted from it, so as to neutralize any halogen acid that may be dissolved in the siloxane mixture.

It is preferred to have a neutral feed mixture to be fed into the continuous process of the present case since that will guarantee that the mixture does not get too acidic as it passes to the catalyst bed in the process of the present invention. During this procedure, there is obtained a siloxane feed mixture having therein siloxanes selected from the class consisting of $(R_2SiO)_x$,

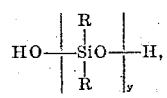

$[R_3Si]_2O$,

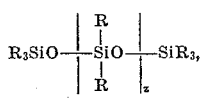

and mixtures thereof where R is selected from the class consisting of alkyl radicals, alkenyl radicals and cycloalkyl radicals and mixtures thereof, that is, where the different R radicals in the various formulas may be the same or different, where the R radicals have anywhere from 1 to 15 carbon atoms, $x$ varies from 3 to 8, $y$ varies from 1 to 10 and $z$ varies from 1 to 10.

This feed mixture, depending on how much water has been decanted from it, will have anywhere from 200 parts per million to 5 percent water, which is water that is not possible to physically decant from the siloxane feed mixture. This is the most preferable feed mixture for the process of the present invention. At this time, there may be added to it additional amounts of chain-stoppers such as, triorganodisiloxanes or low molecular weight triorganosiloxy end-stopped diorganopolysiloxanes such as those of the formulas given above. The additional chain-stoppers will be added to the feed mixture that is obtained by the hydrolysis procedure as is necessary to obtain the desired final product. This, of course, can readily be determined mathematically since the cyclicsiloxanes and the low molecular weight silanol-terminated diorganopolysiloxanes in the feed mixture will function to form the backbone of the final diorganopolysiloxane product while the chain-stoppers, that is, the disiloxanes and the low molecular weight triorganosiloxy end-stopped diorganopolysiloxanes will function to form the terminal silicone atoms or chain-stopping units as well as the backbone of the final desired product.

Accordingly, the amount of chain-stoppers, that is, of the disiloxanes and the low molecular weight triorganosiloxy end-stopped diorganopolysiloxanes, in relation to the cyclicsiloxanes and the silanol-terminated diorganopolysiloxanes in the feed mixture will determine the final viscosity and molecular weight of the desired product that is obtained by the process of the present invention.

Accordingly, at this point as has been stated, additional amounts of chain-stoppers, such as the disiloxanes and low molecular weight triorganosiloxy end-stopped diorganopolysiloxanes, may be added as is necessary in the feed mixture in terms of obtaining the desired product. As has been pointed out, the feed mixture obtained by the hydrolysis procedure is the most preferred feed mixture. However, any other type of feed mixture may be utilized in the process of the present invention. Thus, a feed mixture without any water in it may be utilized or a feed mixture just composed of cyclicsiloxanes or specific types of cyclic siloxanes and chain-stopping units such as, disiloxanes, may be utilized. Other feed mixtures that may be utilized are feed mixtures of a particular type of cyclicsiloxanes rather than a mixture of cyclicsiloxanes in combination with low molecular weight triorganosiloxy end-stopped diorganopolysiloxanes or a feed mixture composed of cyclicsiloxanes in combination with low molecular weight silanol-terminated diorganopolysiloxanes in combination with either or both disiloxanes and low molecular weight triorganosiloxy end-stopped diorganopolysiloxanes.

The feed mixture that contains the ingredients stated above, that is, the cyclicsiloxanes which includes various types of cyclicsiloxanes such as, trisiloxanes, tetrasiloxanes and pentasiloxanes, along with the low molecular weight silanol-stopped diorganopolysiloxanes and the disiloxanes as well as the low molecular weight triorganosiloxy end-stopped diorganopolysiloxanes which has also water in it is preferred since that is the feed mixture that is directly obtained from the simplest and most economical hydrolysis process of the basic silicone ingredients of diorganodihalogensilanes and triorganohalogensilanes.

In the above formulas, R, as stated previously, is selected from the class consisting of alkyl radicals such as, methyl, ethyl, propyl, butyl, and etc.; alkenyl radicals such as, vinyl, allyl and etc.; cycloalkyl radicals such as, cyclohexyl, cyclopentyl, cyclooctyl and etc.; and mixtures of these radicals. The R radicals in the same cyclicsiloxanes or in different cyclicsiloxanes may be the same or different; the R radicals in the low molecular weight silanol end-stopped diorganopolysiloxane may be the same or different and such R radicals may be different from the ones in the cyclicsiloxanes and this is also true of the R radicals in the disiloxanes and the R radicals in the low molecular weight siloxy end-stopped diorganopolysiloxanes in the feed mixture.

Generally, such R radicals are composed of one to 15 carbon atoms and more preferably of one to 10 carbon atoms. As has been stated in the above formulas, $x$ varies from 3 to 8 and is preferably from 3 to 5, $y$ varies from 1 to 10 and is preferably 1 to 5, and $Z$ varies from 1 to 10 and preferably varies from 1 to 5.

Accordingly, this feed mixture which has been neutralized and most of the water decanted from it is taken and passed through a heat exchanger so as to preheat it at a temperature of 85° to 150° C, which is the temperature in which the equilibration process of the present invention is carried out. The entire process takes place continuously through the heat exchanger. From the heat exchanger the feed mixture passes into a catalyst bed which is again maintained at a temperature of 85° to 150° C and more preferably 95° to 135° C. It is preferred that the catalyst bed be located in a packed column. The catalyst bed is composed of acid-activated degranular carbon black. The composition and particle size of such carbon black is critical to the present invention.

The feed mixture which is passed into the catalyst bed and which is preferably located in the column, equilibrated in the column and generally has a residence time in the column of anywhere from 10 minutes to 4 hours and more preferably a residence time of 10 minutes to 1½ hours. At this point, the water that is present in the feed mixture is removed from the feed mixture in the catalyst bed by operating the column at a vacuum and having an overhead condenser continually removing water, not only the water that was present in the feed mixture but also the water that is formed by the condensation of the silanol groups in the low molecular weight silanol-terminated diorganopolysiloxane. Thus, there is preferably maintained over the catalyst bed a vacuum of anywhere from 5 to 200 millimeters of mercury and more preferably a vacuum of 10 to 100 millimeters of mercury. Accordingly, water is continually stripped out from the siloxane feed mixture in the catalyst bed. The water is desirable in the feed mixture and in the catalyst bed from the point of view in that it reduces the acid in the product stream that passes from the catalyst bed. It is undesirable in the catalyst bed in that it tends to lower the efficiency of the catalyst and also to equilibrate into the polysiloxane products which lowers the yield of the desired triorganosiloxy end-stopped diorganopolysiloxane product.

Accordingly, it is critical to the process of the present invention that in the catalyst bed there is maintained a vacuum and that water be continually stripped off from the siloxane feed mixture as well as the polymerized siloxane material that is formed in the catalyst bed. It is also desirable to maintain the reaction temperature in the range of 85° to 150° C and more preferably 95° to 135° C. If the temperature is increased over that point, although the time of the equilibration is decreased and the efficiency of the equilibration or conversion is increased, nevertheless, the product stream emanating from the catalyst bed has an undesirable large amount of acid in it. It is also desirable along with other reasons that the catalyst bed not be too acidic since although the acidity may tend to increase the efficieny of the conversion to the desired product as well as decrease the time of reaction, nevertheless, the high acidity will tend to cleave off hydrocarbon substituent groups from the silicone atoms in the siloxane feed mixture, as well as result in unduly large amounts of acid being present in the product stream emanating from the catalyst bed.

Accordingly, there continuously emanates from the catalyst bed a product stream containing the desired triorganosiloxy end-stopped diorganopolysiloxane of 3 to 50,000 centipoise in high yield where there is also present in such product stream a certain amount of low boiling siloxanes which are primarily cyclicsiloxanes and such product stream will contain from 0 to 5 parts per million of acid and from 100 parts per million to 1 percent by weight of water.

It should be appreciated that what takes place in the catalyst bed is an equilibration reaction in which the siloxanes in the feed mixture are converted or equilibrated to convert them into as large an amount as possible of the desired triorganosiloxy end-stopped diorganopolysiloxane of the desired viscosity. If the process is operating at optimum efficiency, 85 percent by weight of the feed mixture will be converted to the desired triorganosiloxy end-stopped diorganopolysiloxane of the desired viscosity, while the remaining 15 percent will be composed of water, cyclicsiloxanes and various other low boiling siloxanes. It can be appreciated that the purpose of the equilibration process in the catalyst bed is to obtain as high a conversion of the siloxanes in the feed mixture to the desired product. It can also be appreciated that if it was desired to obtain a low molecular weight triorganosiloxy end-stopped diorganopolysiloxane that such material could have been separated from the hydrolyzate that forms the feed mixture of the process of the present invention. However, the yield of the low molecular weight triorganosiloxy end-stopped diorganopolysiloxane would be unduly small since most of the feed mixture is composed of the other siloxane ingredients. Thus, even for the purpose of obtaining low molecular weight silanol triorganosiloxy end-stopped diorganopolysiloxanes, the process of the present invention is advantageous for producing as high a yield as possible from a typical feed mixture of the desired triorganosiloxy end-stopped diorganopolysiloxane of either a low molecular weight or a high molecular weight.

The product stream that is continually taken from the catalyst bed is then continuously passed into a distillation column which is generally maintained at a vacuum of 5 to 30 millimeters of mercury pressure and more preferably 5 to 10 millimeters of mercury pressure. Such distillation column which is operated at a temperature of 250° to 300° C is operated so as to distill off all low boiling siloxanes including cyclicsiloxanes from the water-free product stream that is passed into it including any remaining water that might be present. From this distillation column there continuously passes a final product stream which is almost entirely composed or substantially entirely composed of the desired triorganosiloxy end-stopped diorganopolysiloxanes of the desired viscosity, that is, a viscosity of anywhere from 3 to 50,000 centipoise at 25° C. Such final product stream may then be passed into storage tanks. The low boiling siloxanes with any water that is also obtained in the distillation column may then be recycled into the feed stream that is fed to the catalyst bed or that is fed into the heat exchanger.

The catalyst used in the catalyst bed in which the equilibration takes place in the present process of the present invention is critical to the present process. Thus, it must be an acid-activated granular carbon black which is activated by an acid selected from the group consisting of hydrochloric and sulfuric acid or other strong acids such as, trifluoroacetic acid, where the carbon to acid ratio generally varies from 10 parts to 1 to 40 parts to 1, and more preferably varies from 15 parts to 1 to 30 parts to 1. If the carbon to acid ratio is too high, even though the equilibration or conversion efficiency in the catalyst bed will increase, nevertheless, the high acidity will result in the cleaving of hydrocarbon substituent groups on the silicon atoms. In addition, there will result a high concentration of acid in the product stream from the catalyst bed which would be difficult to neutralize in a continuous manner. Of course, if the acid concentration is below the range set forth above, then the optimum conversion will not be obtained in the catalyst bed column and in addition unduly long residence time of the siloxane feed mixture in the catalyst bed will be required, thus, making the process more like a batch process than a continuous process. It is also necessary that the carbon black be either activated with sulfuric acid or hydrochloric acid since that is the only type of acid-activated carbon black that will allow the maximum conversion of the siloxane feed mixture. In addition, in order to get the desired residence time in the catalyst bed that is generally anywhere from 10 minutes to 2 hours and to get the optimum conversion in the catalyst bed, that is, 85 percent by weight conversion of the siloxane mixture into the desired product, the carbon black must have a U.S. mesh size that generally varies from 8 to 70 and preferably varies from 20 to 50, and a surface area that generally varies from 700 to 2000 square meters per gram and more preferably varies from 1,000 to 1,500 square meters per gram. Again, if the carbon black that is used falls below the lower part of these ranges, then the optimum 85 percent conversion of the siloxane feed mixture into the desired product will not be obtained. If the particle size and the surface area of the carbon black particles fall above the above ranges, then the residence time in the catalyst bed will be undesirably increased.

The above is the most preferred embodiment of the process of the present invention. However, one difficulty with such embodiment is that in the product stream emanating from the catalyst bed, although it has 0 to 5 parts per million of acid which is highly desirable, nevertheless, it will have from 100 parts per million to 1 percent by weight of water in it which has to be separated in some way from the product stream as explained above. In some cases, it may be desirable to have a product stream emanating from the catalyst bed of the process of the present invention which contains less than 100 parts per million of water but a small amount of acid which can be effectively continuously neutralized in a carbon black column. As has been stated previously, the process of the present invention after the formation of the siloxane feed mixture is completely continuous.

As evidence in the most preferred embodiment of the process of the present invention, it is the particular type of acid-activated carbon black that is utilized in the catalyst bed as well as the vacuum stripping of water from the catalyst bed as well as the vacuum stripping of water from the catalyst bed and the siloxane feed mixture that permits the process of the present invention as set forth in the above most preferred embodiment, to be completely continuous with the production of the maximum yield of the desired triorganosiloxy end-stopped diorganopolysiloxane end product.

In the process which will now be described which is the less preferred embodiment of the process of the present invention, the same critical catalyst bed is utilized to obtain a product stream with smaller residence time in the catalyst bed and which product stream contains substantially no water but may contain a small amount of acid in it which can be effectively continuously neutralized by means well known in the art. By proper adjustment of the acid to carbon black ratio and temperature, the product stream from the catalyst bed process can be produced with substantially no acid in it.

Accordingly, this second embodiment of the process of the present invention is preferred in the case where there is large amounts of water in the feed mixture. Accordingly, the siloxane feed mixture that was defined previously or any type of feed mixture having the appropriate amount of cyclicsiloxanes and/or low molecular weight silanol-terminated diorganopolysiloxanes along with the appropriate amount of chain-stoppers such as, disilanes and/or low molecular weight triorganosiloxy end-stopped diorganopolysiloxanes which feed mixture contains from 1,000 parts per million to 10 percent by weight of water is fed into a heat exchanger so that it is heated to a temperature of anywhere from 85° to 200° C and more preferably 95° to 135° C.

This preferred feed mixture after it has been passed through the heat exchanger and heated to anywhere from 85° to 200 ° C, is then continuously passed into a first catalyst bed containing an acid-activated granular carbon black which has the same specifications as the acid-activated carbon black in the preferred embodiment. The first catalyst bed is maintained at a temperature of anywhere from 85° to 200° C and more preferably 95° to 135° C, for the reasons given previously.

Preferably, and of necessity, such first catalyst bed is located in a packed column and there is maintained over it a vacuum of anywhere from 5 to 200 millimeters of mercury and more preferably a vacuum of 10 to 100 millimeters of mercury, and water is continually stripped off from the siloxane feed mixture that passes into the first catalyst bed.

In the first catalyst bed in the first column, the siloxane feed mixture will be partially polymerized. At least all of the silanol groups and some or all of the low molecular weight silanol-terminated diorganopolysiloxanes will be condensed and the water will be stripped off as well as the water that comes into the first catalyst bed in the siloxane feed mixture. In addition, a good portion of the cyclicsiloxanes will be polymerized. Thus, there will continually emanate from said first catalyst bed a partially polymerized product stream containing less than 100 parts per million of water in it. As has been stated previously, the siloxane feed mixture will be continuously fed into the first catalyst bed from the heat exchanger and water will continually be stripped off from said siloxane feed mixture in the first catalyst bed, so as to result in a partially polymerized product stream continually emanating from the first catalyst bed containing less than 100 parts per million of water.

Utilizing the acid-activated carbon black of the present invention, there is obtained in said first catalyst column a residence time of anywhere from 10 minutes to 5 hours and more preferably a residence time of 10 minutes to 2 hours.

The partially polymerized product stream from the first catalyst bed containing less than 100 parts per million of water is then passed into a second catalyst bed which is again preferably located in the packed column, wherein the second catalyst bed is packed with the acid-activated granular carbon black catalyst of the present invention. This second catalyst bed is generally maintained at a temperature of 85° to 150° C and more preferably 95° to 135° C, for the reasons given in connection with the explanation of the preferred embodiment of the present process.

This second catalyst bed is preferably maintained at atmospheric pressure but it should have an overhead condenser unit to strip off any water remaining in the first product stream that is fed into the second catalyst bed. Again, the second catalyst bed containing the acid-activated carbon black or the process of the present invention, in this second catalyst bed the first product stream which is continuously fed into it is completely polymerized, that is, that there is obtained 85 percent conversion of the initial siloxane feed mixture that was fed to the first catalyst bed, the desired triorganosiloxy end-stopped diorganopolysiloxane product with a viscosity of anywhere from 3 to 50,000 centipoise at 25° C.

If the acid-activated granular carbon black of the present invention is utilized in the second catalyst bed, then in the product stream continuously emanating from the second catalyst bed there will be present 85 percent by weight of the desired triorganosiloxy end-stopped diorganopolysiloxanes of anywhere from 3 to 50,000 centipoise viscosity at 25° C, with the other 15 percent by weight of the product stream being composed of low boiling siloxanes. This second product stream emanating from the second catalyst bed will contain less than 100 parts per million of water and 0 to 50 parts per million of acid. With the use of the acid-activated granular carbon black catalyst of the present invention in the second catalyst bed, there will be a resilience time of the first product stream in said second catalyst bed of anywhere from 10 minutes to 2 hours and more preferably anywhere from 10 minutes to 1½ hours.

The second product stream which emanates from the second catalyst bed may then be continually neutralized, if necessary, by passing it through a bed of pure carbon black. This second product stream is continually passed to a distillation column which is preferably maintained at a vacuum of anywhere from 5 to 30 millimeters of mercury and more preferably of a vacuum of anywhere from 5 to 10 millimeters of mercury and which distillation column is also maintained at a temperature of anywhere from 250 to 300° C. In such distillation columns the low boiling siloxanes will be stripped off from the second product stream, which low boiling siloxanes may then be discarded or recycled into the siloxane mixture passing into the heat exchanger prior to its being passed into the first catalyst bed. Such low boiling siloxanes may be added to the feed mixture as is appropriate to obtain the desired viscosity and molecular weight triorganosiloxy endstopped diorganopolysiloxane product. Then there will continuously flow from said distillation column a third product stream composed most entirely of the desired triorganosiloxy end-stopped diorganopolysiloxane product having a viscosity of anywhere from 3 to 50,000 centipoise at 25° C, containing substantially no water and having an alkalinity or an acidity of anywhere from 0 to 5 parts per million. In this second alternate process, the acid-activated granular carbon black that is utilized in the first catalyst bed and the second catalyst bed must be of the same specifications as were discussed above in connection with the preferred embodiment of the process of the present invention.

It is critical to this second embodiment of the present invention that the acid-activated carbon black in both catalyst beds be of the specifications discussed previously in connection with the preferred embodiment and also that there be a vacuum over the first catalyst bed and water be continuously stripped off from the siloxane feed mixture fed into the first catalyst bed or column.

This second embodiment of the present invention is preferred for the cases where it is desired to have a product stream emanating from the final catalyst bed having less than 100 parts per million of water in it. The advantage of the small amount of water in the first product stream that passes into the second catalyst bed is that the equilibration efficiency of the second catalyst bed is considerably enhanced, the catalyst life lengthened and a negligible amount of silanol-containing by-products are formed. In addition, due to the partial polymerization carried out in the first catalyst bed, most of the silanol groups in the siloxane feed mixture that was fed to the first catalyst bed are condensed out in the first catalyst bed and the water removed. Accordingly, there is very little water formed in the second catalyst bed due to the condensation of silanol groups, and, accordingly, again negligible amounts of silanol-containing material is equilibrated and is present in the product stream from the second catalyst bed. However, a product stream may be produced by either of the above processes containing a controlled amount of silanol groups. Accordingly, due to the small amount of water in the first product stream that passes into the second catalyst bed, the equilibration efficiency in the entire process is very high. In the first and preferred embodiment of the present process in which there is utilized a single catalyst bed, there can be obtained 85 percent conversion. However, this percent conversion will only be obtained if the water in the siloxane feed mixture in the single catalyst bed is effectively removed, that is, most of the water that either comes in with the siloxane feed mixture or that is formed due to the condensation of silanol groups is effectively removed. If most of the water is not removed, then the percent conversion will fall below 85 percent.

An advantage of this second embodiment over the first embodiment is that the catalyst beds last a much longer time before they have to be regenerated. It should be mentioned that either with the first embodiment or the second embodiment, it is preferred that after the catalyst bed has spent itself to regenerate the acid-activated granular carbon black rather than throw it out. However, to maintain the process completely continuous while one set of catalyst bed or beds in either embodiment are in use, another set of catalyst bed or beds may be regenerated. Thus, when the bed or beds in use in either embodiment are spent, by the switching of a valve, the feed stream can be redirected into the regenerated catalyst bed or beds. In this manner, the process can be kept continually continuous irrespective of the eventual need to regenerate the catalyst bed.

Accordingly, there is provided by the present invention a truly continuous process as exemplified by the first preferred embodiment and as exemplified by the second less preferred embodiment discussed above for utilizing an inexpensive, efficient and effective catalyst which comprises the acid-activated granular carbon black defined above so as to continually and economically and efficiently produce from an inexpensive siloxane feed mixture, triorganosiloxy end-stopped diorganopolysiloxane oils of viscosities of anywhere from 3 to 50,000 centipoise at 25° C.

The examples given below are given for the purpose of illustrating specific embodiments of the present invention and are not intended to limit the scope of the present specification and claims. All parts in the examples are by weight.

EXAMPLE 1

There is present a column maintained at 125° C and at a pressure of 100 mm of Hg. The column is packed to 95 percent to its height with carbon black activated with H$_2$SO$_4$ having a carbon black to acid ratio of 1 to 25 and having a U.S. mesh size ranging from 20 to 50 sold under the tradename Pittsburgh (OL) activated carbon sold by Calgon Co. To this column there is fed continuously a feed stream composed of 4 percent by weight of hexamethyldisoloxane and 96 percent by weight octamethylcyclictetrasiloxane with 1000 parts per million of water. This feed stream is preheated to 125° C by continuously passing it through a heat exchanger prior to passing it to the acid-activated carbon black column. In the packed column, water and cyclicsiloxanes are removed overhead continuously and condensed in a condenser. The water is separated from the low boiling siloxanes and the siloxanes are recycled to feed stream going into the column. The siloxane stream in the acid-activated carbon black column has a residence time of 1.5 hours. There is continuously passed from the acid-activated carbon black column a product stream composed of 15 percent by weight of low boiling siloxanes, 85 percent by weight of the desired end product, 200 parts per million of water, and 3 parts per million of acid. The stream is continuously passed into a distillation column maintained at 250° C and 5 millimeters of Hg to strip off the low boiling siloxanes and remove water. The low boiling siloxanes are recycled as needed to the feed stream going into the acid-activated carbon black column. There is continuously transferred from the distillation column the desired product which is a dimethylpolysiloxane which is tri-methylsiloxy end-stopped of 90 centipoise viscosity at 25° C, which contains substantially no water and 3 parts per million of acid.

EXAMPLE 2

A feed mixture composed of 2 percent by weight of hexamethyldisiloxane and

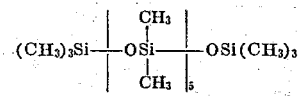

with 96 percent by weight of tetramethyltetravinyltetracyclicsiloxanes and

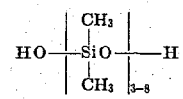

having 2 percent by weight of water is continuously passed through a heat exchanger, heated to 150° C and then continuously transferred into a first column which is packed to 95 percent of its height with H$_2$SO$_4$ acid treated carbon black having an acid to carbon black ratio of 1 to 20 and a U.S. mesh size of 20 to 50. This carbon black is sold under the tradename of Pittsburgh (OL) by Calgon Co. The first column is maintained at 150° C and 50 millimeters of Hg. pressure. There is taken an overhead stream of water and low boiling siloxanes wherein the water and low boiling siloxanes are condensed in a condenser and the low boiling siloxanes returned to the feed stream going into said first column. There is a residence time of 30 minutes of the siloxane stream in the first column.

From the first column there is continuously passed a product stream containing 50 parts per million of water and substantially no acid into a second catalyst column which is packed to 95 percent of its weight with an H$_2$SO$_4$ acid-activated carbon black of an acid to carbon black ratio of 30 to 1 and a U.S. mesh size ranging from 20 to 50, which is sold by Calgon Co., as stated previously. The column is maintained at 95° C and at atmospheric pressure. There is a residence time of 1 hour in the second catalyst column of the siloxane stream. There is continuously transferred from the second catalyst column a product stream containing 85 percent by weight of the desired product, 15 percent by weight of low boiling siloxanes, 50 parts per million of water, 15 parts per million of acid where the mixture has a viscosity of 270 centistokes at 25° C. This product stream is then continuously passed through a bed of pure carbon black and there is continuously removed from such bed the desired product with substantially no acid in it. The product stream from the bed of pure carbon black is continuously transferred to a distillation column maintained at 280° C and 10 millimeters of Hg. pressure where the remaining water and low boiling siloxanes are stripped off.

The low boiling siloxanes that are stripped off may be separated from the water and then recycled to the feed mixture going into the first catalyst column, as needed. The product stream which is continuously passed from the distillation column contains substantially no water, 0–2 parts per million of acid and is a dimethylmethylvinylpolysiloxane which is trimethylsiloxy end-stopped of 450 centistokes viscosity at 25° C.

I claim:

1. A continuous process for producing diorganopolysiloxane oils of 3 to 50,000 centipoise viscosity at 25° C comprising continuously passing a fluid siloxane feed mixture having therein siloxanes selected from the class consisting of $(R_2SiO)_x$,

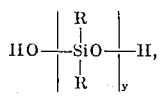

[R₃Si]₂O and

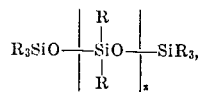

and mixtures thereof where R is selected from the class consisting of alkyl radicals, alkenyl radicals, cycloalkyl radicals and mixtures thereof of one to 15 carbon atoms, $x$ varies from 3 to 8, $y$ varies from one to 10 and $z$ varies from one to 10, into contact with a catalyst bed of acid-activated granular carbon black having a carbon to acid ratio of 10 parts to 1 part, to 40 parts to 1 part which catalyst bed is maintained at 85° to 150° C and over which catalyst bed there is maintained a vacuum of 5 to 200 millimeters of Hg and removing from the catalyst bed a product stream containing the diorganopolysiloxane of 3 to 50,000 centipoise viscosity at 25° and various low boiling siloxanes.

2. The process of claim 1 wherein the catalyst bed is located in a packed column and further comprising continuously transferring said product stream from the catalyst bed into a distillation column maintained at 250° – 300° C and 5 to 30 millimeters of Hg pressure, continuously removing low boiling siloxanes from said product stream and having from said distillation column a final product stream composed essentially of the desired product.

3. The process of claim 2 wherein the feed mixture into the catalyst bed has from 1000 parts per million to 5 percent water and wherein the product stream from said catalyst bed has 100 parts per million to 1 percent by weigth of water and from 0 to 5 parts per million of acid.

4. The process of claim 3 wherein prior to passing said feed mixture into said catalyst bed it is passed into a heat exchanger and heated from 85° to 150° C.

5. The process of claim 4 wherein the acid-activated carbon black is activated with an adid selected from the class consisting of H₂SO₄ and HCl.

6. The process of claim 5 wherein the acid-activated carbon black has a U.S. mesh size that varies from 8 to 70 and a surface area that varies from 700 to 2,000 square meters per gram.

7. The process of claim 6 wherein the R radical is selected from the class consisting of methyl, ethyl and vinyl.

8. The process of claim 3 wherein prior to passing said product stream into said distillation column, water is continuously removed from said product stream and that said stream passing into said distillation column has less than 100 parts per million of water.

9. The process of claim 6 wherein said catalyst bed is in a column and is present at a concentration of 40 to 200 percent by weight of the fluid siloxane mixture in contact with said catalyst bed.

10. The process of claim 9 wherein said siloxane feed mixture has a residence time of 10 minutes to 4 hours in contact with said catalyst bed.

11. A continuous process for producing a diorganopolysiloxane oil of 3 to 50,000 centipoise viscosity at 25° C comprising (a) continuously passing a siloxane feed mixture having therein from 1,000 parts per million to 10 percent by weight of water selected from the class consisting of $(R_2SiO)_x$,

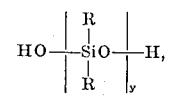

[R₃Si]₂O and

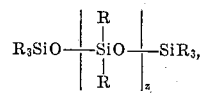

and mixtures thereof where R is selected from the class consisting of alkyl radicals, alkenyl radicals, cycloalkyl radicals and mixtures thereof of one to 15 carbon atoms, $x$ varies from 3 to 8, $y$ varies from 1 to 10 and $z$ varies from 1 to 10, into contact with a first catalyst bed of acid-activated granular carbon black having a carbon to acid ratio of 10 parts to 1 part, to 40 parts to 1 part which catalyst bed is maintained at 85° to 200° C and over which catalyst bed there is maintained a vacuum of 5 to 200 millimeters of Hg; (b) continuously removing water from said first catalyst bed; (c) continuously transferring from said first catalyst bed a first product stream containing less than 200 parts per million of water into a second catalyst bed of acid-activated granular carbon black having a carbon to acid ratio of 10 parts to 1 part, to 40 parts to 1 part, which second catalyst bed is maintained at 85° to 150° C, and at least at atmospheric pressure; (d) continuously removing from said second catalyst bed a second product stream containing the desired diorganopolysiloxanes of 3 to 50,000 centipoise at 25° C and various low boiling siloxanes.

12. The process of claim 11 wherein said second product stream contains substantially no water and 0 to 50 parts per million of acid, further comprising continuously transferring said second product stream through a bed of pure carbon black such that the stream has from 0 to 5 parts per million of acid and continuously passing the stream after neutralization into a distillation column maintained at 250° to 300° C and at 5 to 30 millimeters of Hg pressure so as to continuously remove low boiling siloxanes, continuously transferring a third product stream from said distillation column which third product stream is essentially the pure diorganopolysiloxane desired product of 3 to 50,000 centipoise viscosity at 25° C and continuously passing said low boiling siloxanes removed in said distillation column to said siloxane feed mixture passed into said first catalyst bed.

13. The process of claim 12 wherein prior to passing said siloxane feed mixture into said first catalyst bed it is transferred through a heat exchanger where it is heated from 85° to 150° C.

14. The process of claim 13 wherein the acid-activated granular carbon black in said first and second catalyst bed is activated with an acid selected from the class consisting of $H_2SO_4$ and $HCl$.

15. The process of claim 14 wherein the acid-activated carbon black has a U.S. mesh size that varies from 8 to 70 and a surface area that varies from 700 to 2,000 square meters per gram.

16. The process of claim 15 wherein said first catalyst bed is in a column and is present at a concentration of 10 to 200 percent by weight of the said siloxane mixture in contact with said first catalyst bed and wherein said second catalyst bed is in a column and is present at a concentration of 40 to 200 percent by weight of said first product stream in contact with said second catalyst bed.

17. The process of claim 16 wherein said feed mixture has a residence time of 10 minutes to 5 hours in contact with said first catalyst bed and said first product stream has a residence time of 10 minutes to 2 hours in contact with said second catalyst bed.

18. The process of claim 11 wherein the R radical is selected from the class consisting of methyl, ethyl, and vinyl.

* * * * *